Figure 1:
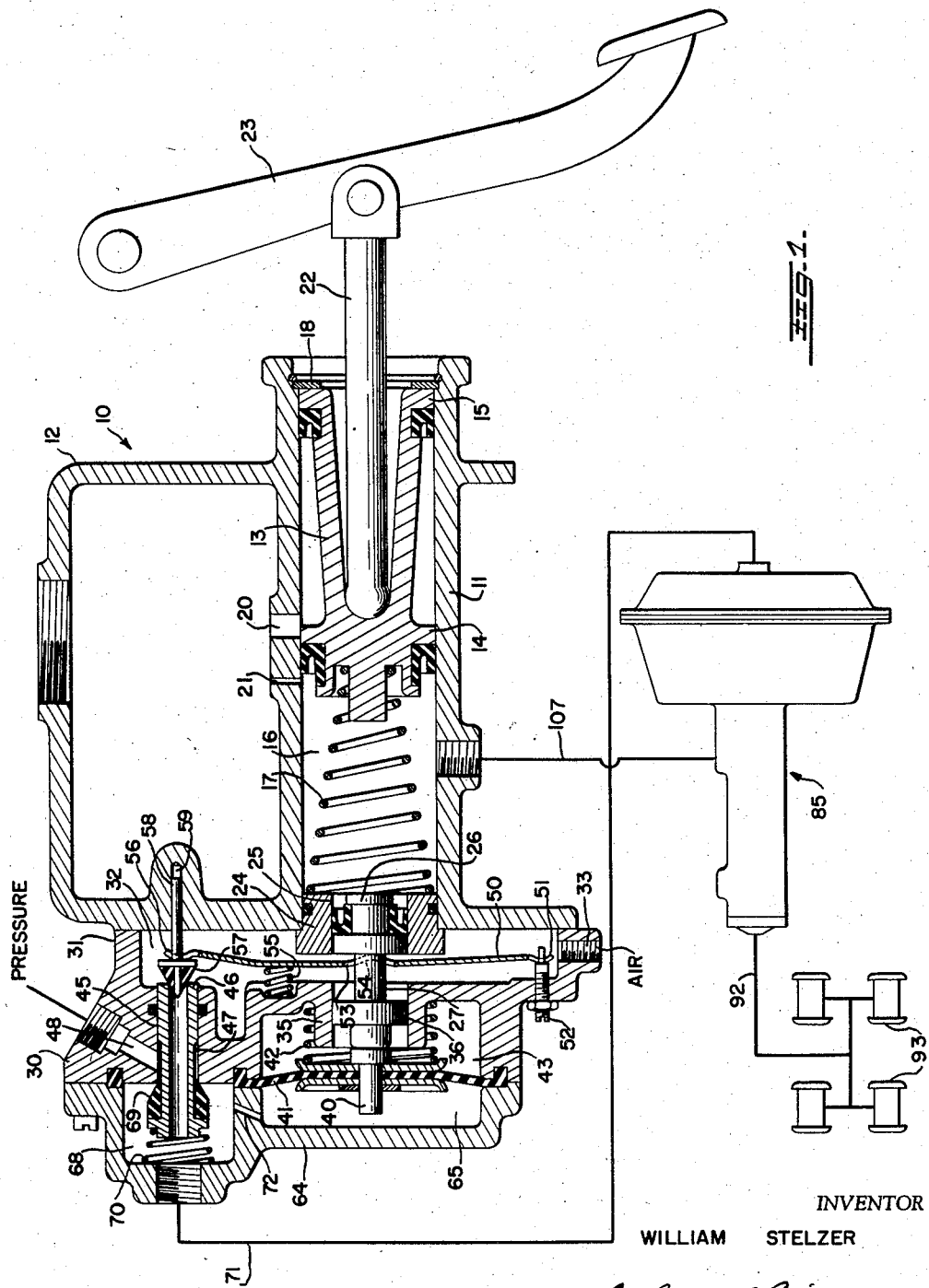

April 28, 1959  W. STELZER  2,883,831
BOOSTER BRAKE MECHANISM
Filed Jan. 22, 1957  2 Sheets-Sheet 1

INVENTOR
WILLIAM STELZER
BY John F. Phillips
ATTORNEY

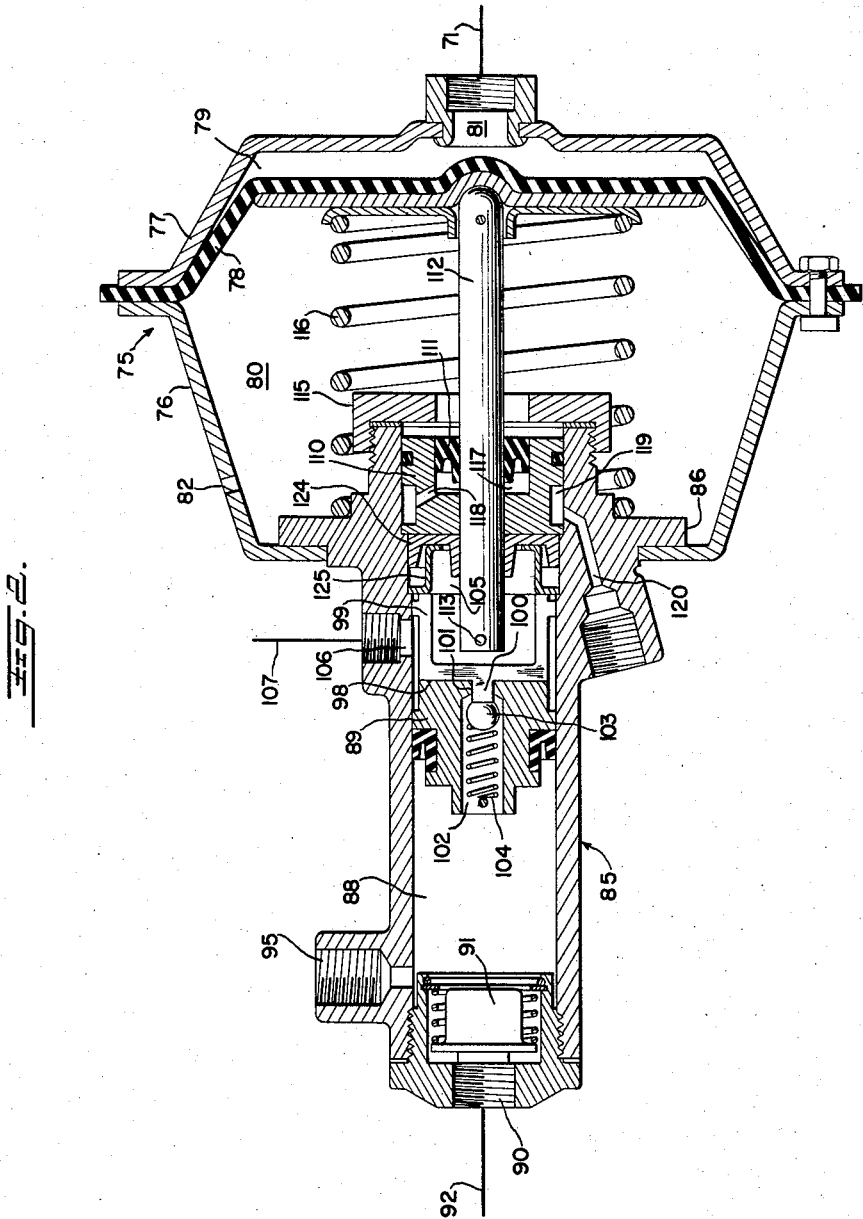

_United States Patent Office_ 2,883,831
Patented Apr. 28, 1959

2,883,831

BOOSTER BRAKE MECHANISM

William Stelzer, Bloomfield Hills, Mich., assignor to Kelsey-Hayes Company, Detroit, Mich., a corporation of Delaware Application January 22, 1957, Serial No. 635,353

11 Claims. (Cl. 60—54.5)

This invention relates to a booster brake mechanism.

An important object of the invention is to provide a novel type of booster mechanism wherein a pedal operable master cylinder is employed for operating a valve mechanism for controlling the booster motor, and wherein the valve operating mechanism is arranged in coaxial relationship with and directly subject to operation by the master cylinder.

A further object is to provide such a mechanism which embodies a highly compact valve mechanism for controlling the booster motor, the entire valve mechanism and the operating means therefor being directly mounted on the master cylinder unit.

A further object is to provide a booster of the character referred to which is particularly adapted for use with a source of super-atmospheric pressure for operating the booster motor.

A further object is to provide a novel arrangement of valve operating lever so cooperating with the parts to assist in achieving a high degree of compactness in the valve mechanism.

A further object is to provide novel means for utilizing the operating pressure supplied to the motor for reacting against the pressure in the pedal operable master cylinder to thereby provide reaction against the pedal.

Other objects and advantages of the invention will become apparent during the course of the following description.

In the drawings I have shown one embodiment of the invention. In this showing:

Figure 1 is a vertical axial sectional view through the master cylinder and the associated valve mechanism, the remaining portions of the system being diagrammatically shown; and Figure 2 is an axial sectional view through the booster motor and high pressure master cylinder.

Referring to Figure 1, the numeral 10 designates a master cylinder unit as a whole comprising a master cylinder 11 and a substantially conventional reservoir 12 arranged thereabove. A plunger 13 is movable into the master cylinder and comprises sealed heads 14 and 15 the former of which is movable to the left in Figure 1 to displace fluid from the hydraulic chamber 16 of the master cylinder. A spring 17 in the chamber 16 biases the plunger 13 to its off position, in which movement of the plunger is limited by a stop ring 18. In a conventional manner, the space behind the head 14 is maintained full of brake fluid through a port 20, while a small compensating port 21 communicates between the reservoir and the chamber 16 just forwardly of the head 14. The plunger 13 is conventionally operated by a rod 22 connected to the usual brake pedal 23.

A plug 24 is seated in the left-hand end of the master cylinder in Figure 1 and forms a cylinder 25 in which is slidable a sealed plunger 26 carried by a stem 27. The plunger 26 is movable to the left in Figure 1 under the influence of pressure in the chamber 16 for a purpose to be described.

A valve housing 30 is fixed against the left-hand end of the unit 10. The housing 30 is provided with a flange 31 seating against the unit 10 and forming therein an atmospheric chamber 32. This chamber is open to the atmosphere through a port 33, preferably provided with an air cleaner (not shown).

The housing 30 is provided in axial alinement with the master cylinder 11 and plunger 26 with a cylinder 35 in which is slidable a head 36 carried by the stem 27. The left-hand end of the stem 27 in Figure 1 engages a stem 40 fixed axially to a diaphragm 41 biased to the left by a spring 42. The diaphragm 41 forms with the housing 30 a chamber 43 coaxial with the cylinder 35.

The housing 30 is provided with a bore 45 in which is slidable a tube 46 one end portion of which is reduced in diameter as at 47 to provide a space communicating with a port 48. This port is adapted for connection with a suitable source of super-atmospheric pressure.

In the atmospheric chamber 32 is arranged a lever 50 having a hooked lower end 51 engaging in the eye at the inner end of a screw 52 to serve as a fulcrum for the lever. Intermediate its ends, the lever is provided with an opening 53 through which the stem 27 projects, and on opposite sides of such stem, the lever 50 is provided with a bowed portion 54 forming a bearing engageable with the adjacent face of the head 26. The upper end of the lever 50 may be biased to the right by a spring 55. At its upper end, the lever 50 is forked as at 56 to engage against the back of a valve 57, preferably conical and formed of resilient material, as shown in Figure 1. This valve is engageable in the adjacent end of the tube 46 and is normally disengaged therefrom to afford communication between the chamber 32 and the interior of the tube 46. The valve 57 is carried by a stem 58 slidable in a bearing opening 59 formed in the wall of the reservoir 12.

A cover member 64 is arranged against the valve housing 30 and is provided therein with a variable pressure chamber 65 one wall of which is formed by the diaphragm 41 so that the latter is subject to pressure in the chamber. Adjacent the top thereof, the cover member 64 is provided with a control chamber 68 into which the forward or left-hand end of the tube 46 projects. Such end of the tube is provided with a resilient poppet valve 69 engaging the adjacent end of the bore 45, acting as a seat for the valve. The valve 69 is normally closed and is biased to such position by a spring 70. The chamber 68 is in constant communication with one end of a fluid line 71 leading to the booster motor to be described. The chambers 65 and 68 communicate through a port 72.

The booster unit for the mechanism is shown in Figure 2. This unit comprises a motor indicated as a whole by the numeral 75 and shown in the present instance as comprising a pair of casing sections 76 and 77 between which is clamped the periphery of a diaphragm 78. This diaphragm divides the motor to form a pair of chambers 79 and 80 the former of which is provided with a port 81 communicating with the other end of the line 71. The chamber 80 is open to the atmosphere as at 82.

A preferably die-cast unit 85 comprising a high pressure master cylinder is flanged as at 86 for attachment in any suitable manner to the casing section 76. The master cylinder 85 has therein a high pressure chamber 88 from which fluid is adapted to be displaced by operation of a plunger 89. The outlet 90 of the chamber 88 is controlled by a conventional residual pressure valve 91 and through the outlet 90, fluid flows through lines 92 (Figures 1 and 2) to the vehicle wheel cylinders 93.

The unit shown in Figure 2 is adapted for use in other systems in which another fluid line connection is made to the chamber 88 as at 95. Such connection is not used in the present case, however, and the connection 95 accordingly normally will be plugged.

The plunger 89 is diametrically grooved as at 98 to receive a U-shaped stamped sheet metal member 99 and the rear or right-hand extremity of the plunger 89 is substantially co-extensive with the corresponding end of the member 99. The member 99 has a projection 100 extending through an opening 101 in the plunger 89 and communicating through a bore 102 with the chamber 88. The rear end of the bore 102 forms a valve seat engageable by a ball valve 103, normally held in open position by the projection 100. The ball valve is biased to closed position by a spring 104. The member 99, ball valve 103 and associated elements constitute means further referred to below for affording communication between the chamber 88 and a chamber 105 to the right of the plunger 89 and these features form per se no part of the present invention. The chamber 105 communicates through a port 106 with one end of a fluid line 107. The other end of this line communicates with the master cylinder chamber 16 (Figure 1).

Within the rear end of the unit 85 is arranged a bearing 110 sealed as at 111 around an operating rod 112 connected at its rear end to be operated by the diaphragm 78 and connected at its forward end by a pin 113 to the plunger 89 on opposite sides of the diametrical slot 98. A cap 115 is threaded on the rear end of the unit 85 within a biasing spring 116 which tends to hold the diaphragm 78 in the normal off position shown.

The space 117 forwardly of the seal 111 communicates through a port 118 with an annular groove 119 to which fluid may be supplied through a passage 120 from any suitable reservoir. Thus the seal 111 is assisted in its sealing operation by the presence of the hydraulic fluid forwardly thereof and around the adjacent portion of the rod 112.

A supplementary bearing 124 is arranged forwardly of the bearing 110 and is engaged by a cup-shaped seat 125 which serves to limit movement to the right in Figure 2 of the U-shaped member 99.

*Operation*

The motor and the parts associated therewith are shown in their normal positions in Figure 2. In Figure 1 the plunger 13 is shown in normal position and the valve mechanism is illustrated in the lap valve positions which will be assumed momentarily when the pedal is released. In the normal positions of the parts, the plunger 26 will be slightly further to the right than shown in the drawing, and the same is true of the upper end of the lever 50, the valve 57 being normally open and the valve 69 normally closed. The stem 40 will have its free end normally engaged with the left-hand wall of the chamber 65, the diaphragm 41 occupying a corresponding position.

When the mechanism is to be operated, the pedal 23 will be depressed to move the plunger 13 to the left in Figure 1, initially closing the compensating port 21 and then starting to build up pressure in the chamber 16. Fluid will be displaced from this chamber through line 107 into the chamber 105 (Figure 2). The ball 103 being held off its seat by the projection 100, fluid will flow into chamber 88, thence through lines 92 to the wheel cylinders 93 to take up the play between the brake shoes and brake drums.

Pressure built up in the master cylinder chamber 16 in the manner described will move the plunger 26 toward the left, swinging the upper end of the lever 50 in the same direction. This action initially seats the valve 57 and then moves the tube 46 to the left in Figure 1 to open the valve 69. The seating of the valve 57 closes the atmospheric chamber 32 to the control chamber 68 and opens the latter chamber to the source of super-atmospheric pressure connected to the port 48. Fluid under pressure accordingly will flow from the chamber 68 through the line 71 into the motor chamber 79 (Figure 2) to start to move the diaphragm 78 toward the left. This movement of the diaphragm 78 takes place against the tension of the return spring 116 and transmits movement through the transverse pin 113 to the rear end of the plunger 89. Such plunger will be moved independently of the U-shaped member 99 which momentarily will remain stationary in engagement with the stop 125.

As the plunger 89 moves forwardly, the spring 104 will seat the ball 103, thus cutting off communication between the chambers 88 and 105. The force delivered by the diaphragm 78 therefore will move the plunger 89 to the left to generate pressures in the chamber 88 to force fluid under pressure through lines 92 into the wheel cylinders 93. It will be apparent that after the ball valve 103 seats, pressure delivered to the chamber 105 from the master cylinder chamber 16 will assist the motor 78 in transmitting force to the plunger 89 to develop pressure in the chamber 88. In other words, part of the work is performed by the operator and part by the booster motor, and pressure generated in the chamber 105 will always be in proportion to the pressure in the chamber 88. The pressure in the chamber 105 of course will be duplicated in the chamber 16 (Figure 1) and the operator, particularly in later stages of brake operation, will feel direct hydraulic reaction against his foot on the pedal 23.

Prior to the transmission of substantial hydraulic reaction to the brake pedal, the diaphragm 41 functions to provide intermediate and progressively increasing reaction. In the normal positions of the parts, the left-hand end of the stem 40 (Figure 1) will engage the adjacent wall of the chamber 65. As pressure increases in the chamber 68, it will also increase in the chamber 65 to act against the diaphragm 41 and move the latter to the right against the tension of the spring 42. The head of the stem 40 will move into engagement with the adjacent end of the stem 27, thus providing an elastic fluid reaction force opposing movement of the plunger 26 to the left, thus transmitting a reaction through the fluid in the chamber 16 to the plunger 13 and thus to the pedal 23.

When brake application takes place to a predetermined point, the pressures developed in the chamber 16 will overcome the elastic fluid pressure in the chamber 65 and the stem 40 will again move into engagement with the adjacent wall of the chamber 65, the latter acting as a stop. From this point on, pressure in the chamber 16 will deliver substantially wholly a hydraulic reaction against the plunger 13.

The brakes are released by releasing the pedal 23. The spring 17 moves the plunger 13 back to its normal off position, promptly dropping the pressure in the chamber 16 and relieving the previous force acting to the left against the plunger 26. The spring 55, if employed, will then promptly move the valve 57 to the right in Figure 1. The first part of this movement will be accompanied by the closing of the valve 69, followed by the opening of the valve 57. The closing of the valve 69 disconnects the pressure port 48 from the chamber 68, and the opening of the valve 57 connects the chamber 68 to the atmospheric chamber 32. As the parts are released in the manner described, the first return movement of the lever 50 will permit the valve 69 to close, at which point the valve elements will occupy the lap positions shown in Figure 1. Thereafter, the valve 57 opens as, and for the purpose, stated.

The present mechanism is particularly intended for use with a source of super-atmospheric pressure in which case the use of the spring 55 is unnecessary. When the parts reach the lap position shown in Figure 1 as the brake pedal is released, pressure will be present in the chamber 68 and when the pressure of the lever end 58 is relieved from the valve 57, air pressure in the tube 46 will move the valve 57 to its fully open position.

The opening of the valve 57 connects the motor chamber 79 (Figure 2) to the atmosphere through line 71, chamber 68, the interior of the tube 46 and the atmospheric chamber 32. The return spring 116 (Figure 2) will then return the diaphragm 78 to its normal position, lowering the pressure in the chamber 88 and releasing the brake cylinders. Just before the fully off positions of the parts are reached, the U-shaped sheet metal member 99 will engage at the left-hand end thereof against the stop 125, whereupon slight further movement of the plunger 89 to the fully off position will cause the projection 100 to open the ball valve 103 to connect the chambers 88 and 105. Any loss of fluid from the high pressure end of the system can then be replenished through the opening 101.

From the foregoing, it will be apparent that the present construction is highly practicable and provides a very compact arrangement of the valve mechanism for the motor and the intermediate reaction means comprising the diaphragm 41. The apparatus provides an initially "soft" pedal, and in the interim between initial depression of the pedal 23 and the point at which substantial hydraulic reactions are transmitted to the brake pedal, the diaphragm 41 comes into operation to provide a smooth and progressively increasing reaction against the brake pedal to eliminate any lumpiness in the operation of the apparatus. The lever 50 is conveniently arranged in the vertically elongated atmospheric chamber 32, to assist in maintaining a compactness in the arrangement of the parts. Since valve operating forces are transmitted through the lever substantially half way between the fulcrum of the lever and the valve 57, the latter will be subject to very rapid operation when the pedal is moved to generate pressures in the chamber 16. The reverse is true when the brakes are to be released, the lever 56 providing an extremely rapid returning of the valves to normal positions to substantially instantly drop the pressure in the motor chamber 79 (Figure 2) for the rapid releasing of the brakes.

Particular attention is invited to the fact that the parts of the device shown structurally in Figure 1 not only are highly compact, but are arranged for economical production and efficient operation. The master cylinder 11, plungers 13 and 26, stem 40 and diaphragm 41 are all coaxially arranged with the plunger 26 exposed directly to the master cylinder chamber 16. This coaxial arrangement of the parts referred to renders the device easily and smoothly operable and assists in the economical production of the mechanism.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster mechanism comprising a fluid pressure motor having a pressure responsive unit, a high pressure cylinder, a plunger in said cylinder connected to said pressure responsive unit and movable thereby to displace fluid from one end of said high pressure cylinder, a master cylinder, a pedal operable plunger movable in said master cylinder to create pressure therein, a fluid line connecting said master cylinder to the other end of said high pressure cylinder whereby pressures in said master cylinder assist said motor in operating said high pressure plunger, said motor having a variable pressure chamber, a valve mechanism connected between said variable pressure chamber and sources of different pressures, said valve mechanism comprising a normally open valve connecting said variable pressure chamber to one source and a normally closed valve controlling communication between said variable pressure chamber and the other source, a tube carrying said other valve and normally establishing communication between said variable pressure chamber and said one source and having one end engageable by said normally open valve to close such communication and to be moved thereby to open said normally closed valve, a control plunger having one end exposed to pressure in said master cylinder, motion transmitting means connected between said control plunger and said normally open valve to move the latter to closed position and move said tube to open said normally closed valve, and pressure responsive means exposed to pressure in said variable pressure chamber and engageable with but normally biased away from said control plunger to oppose movement thereof by pressure in said master cylinder proportionate to the pressure in said variable pressure chamber.

2. A mechanism according to claim 1 wherein said motion transmitting means comprises a lever fulcrumed at one end and having its other end connected to said normally open valve, said lever intermediate its ends engaging said control plunger to be operated thereby.

3. A mechanism according to claim 1 wherein said pressure responsive means comprises a diaphragm having one side exposed to pressure corresponding to that in said variable pressure chamber and having an axial stem engageable with and normally biased away from said control plunger.

4. A mechanism according to claim 1 wherein said pressure responsive means comprises a diaphragm having one side exposed to pressure corresponding to that in said variable pressure chamber and having an axial stem engageable with and normally biased away from said control plunger, and a plug mounted in the end of said master cylinder and forming a cylinder in which said control plunger is slidable, said master cylinder, said control plunger and said stem being coaxially arranged.

5. A booster mechanism comprising a fluid motor having a pressure responsive unit and a variable pressure chamber, a high pressure cylinder coaxial with said motor, a high pressure plunger connected to said pressure responsive unit and movable in said high pressure cylinder to displace fluid from one end thereof, a master cylinder, a pedal operable plunger movable in said master cylinder to displace fluid therefrom, a fluid line connecting said master cylinder to the other end of said high pressure cylinder, a housing fixed against one end of said master cylinder and provided adjacent such cylinder with a low pressure chamber communicating with a source of low pressure, said housing having a control chamber communicating with said variable pressure chamber, a slidable tube offset from the axis of said master cylinder and extending between said control chamber and said low pressure chamber, a normally open valve in said low pressure chamber engageable with said tube to close the passage therethrough, a normally closed valve in said control chamber carried by said tube, said housing and said tube cooperating to form a high pressure chamber communicating with a high pressure source and which chamber is opened to said control chamber when said normally closed valve is opened, a control plunger coaxial with said master cylinder and having one end exposed to pressure therein, motion transmitting means connected between said control plunger and said normally open valve to close the latter and slide said tube axially to open said normally closed valve, a reaction diaphragm having one side exposed to pressure in said control chamber, and a stem carried by said diaphragm coaxial and engageable with and normally biased away from said control plunger to oppose valve operating movement of the latter in proportion to pressure in said control chamber.

6. A mechanism according to claim 5 wherein said motion transmitting means comprises a lever arranged in said low pressure chamber and fulcrumed at one end, the other end of said lever being connected to said low pressure valve, said lever intermediate its ends engaging said control plunger to be operated thereby.

7. A booster mechanism comprising a fluid motor, a pressure responsive unit therein dividing said motor to form an atmospheric chamber and a variable pressure chamber, a high pressure cylinder, a high pressure plunger in said cylinder connected to said pressure responsive unit and movable to displace fluid from one end of said high pressure cylinder, a body forming a master cylinder, a pedal operable plunger movable therein to displace fluid therefrom, a fluid line connecting said master cylinder to the other end of said high pressure cylinder to assist said pressure responsive unit in moving said high pressure plunger, a housing fixed to one end of said master cylinder and having an atmospheric chamber therein elongated transversely of the axis of said master cylinder and of which chamber one wall is formed by said body, said housing having a control chamber communicating with said variable pressure chamber and a bore parallel to and laterally offset from the axis of said master cylinder and extending between said atmospheric and control chambers, a tube slidable in said bore, a normally open valve in said atmospheric chamber coaxial with said tube and engageable with the adjacent end thereof to close said tube to said atmospheric chamber and move said tube axially, a normally closed valve in said control chamber carried by said tube, said bore and said tube cooperating to form a high pressure chamber connected to a source of super-atmospheric pressure, a control plunger having one end exposed to pressure in said master cylinder, and a lever in said atmospheric chamber elongated longitudinally thereof and fulcrumed at one end and connected at its other end to said normally open valve, said lever intermediate its ends engaging said control plunger to be operated thereby.

8. A mechanism according to claim 7 provided with fluid pressure responsive means exposed to pressure in said control chamber and engageable with said control plunger to oppose valve operating movement of the latter proportionate to pressure in said control chamber.

9. A mechanism according to claim 7 provided with a diaphragm cooperating with said housing to form a reaction chamber communicating with said control chamber, and an axial stem carried by said diaphragm and engageable with and normally biased away from said control plunger, said stem, said control plunger and said master cylinder being coaxial.

10. A booster mechanism comprising a fluid pressure motor having a pressure responsive unit, a high pressure cylinder, a plunger in said cylinder connected to said pressure responsive unit and movable thereby to displace fluid from one end of said high pressure cylinder, a body having a master cylinder formed therein, a pedal operable plunger movable in said master cylinder to create pressure therein, a fluid line connecting said master cylinder to the other end of said high pressure cylinder whereby pressures in said master cylinder assist said motor in operating said high pressure plunger, said motor having a variable pressure chamber, a housing at one end of said body provided with a flange engaging such end of said body and forming therewith a low pressure chamber connected to a source of low pressure, a control chamber in said body laterally offset from the axis of said master cylinder and communicating with said variable pressure chamber, a valve mechanism connected between said control chamber, said low pressure chamber and a source of higher pressure and operable to disconnect said control chamber from said low pressure chamber and connect it to said source of higher pressure, a lever in said low pressure chamber extending substantially transversely of the axis of said master cylinder, a control plunger adjacent said end of said body exposed at one end directly to said master cylinder and connected to said lever to operate it by pressure in said master cylinder, a diaphragm structure in said housing having a diaphragm element forming with said housing a reaction chamber communicating with said control chamber, and means biasing said diaphragm structure away from said control plunger whereby the latter is movable independently of said diaphragm structure upon initial generation of pressure in said master cylinder and whereby increases in pressure in said reaction chamber incident to connecting said control chamber to said high pressure source will move said diaphragm structure into engagement with said control plunger to oppose movement thereof.

11. A mechanism according to claim 10 wherein said housing is provided with a bore between said low pressure chamber and said control chamber, said valve mechanism comprising a tubular member slidable in said bore and having a valve seat at the end thereof in said control chamber, said lever having a valve engageable with and normally disengaged from said seat, and a normally closed valve carried by said tubular member in said control chamber and normally engaging the adjacent end of said bore, said end of said bore communicating with said source of higher pressure.

References Cited in the file of this patent

UNITED STATES PATENTS

| | | |
|---|---|---|
| 2,215,602 | Baade | Sept. 24, 1940 |
| 2,381,989 | Stelzer | Aug. 14, 1945 |
| 2,406,328 | Gunderson | Aug. 27, 1946 |
| 2,662,376 | Price et al. | Dec. 15, 1953 |
| 2,670,603 | Allin et al. | Mar. 2, 1954 |
| 2,720,954 | Pratt | Oct. 18, 1955 |
| 2,799,140 | Osborne | July 16, 1957 |